United States Patent
Akkineni et al.

(10) Patent No.: US 11,012,301 B2
(45) Date of Patent: May 18, 2021

(54) NOTIFICATION AND TRANSFER OF LINK AGGREGATION GROUP CONTROL IN ANTICIPATION OF A PRIMARY NODE REBOOT

(71) Applicant: Dell Products L.P., Round Rock, TX (US)

(72) Inventors: Ravisekhar Akkineni, Chennai (IN); Saye Balasubramaniam Subramanian, Chennai (IN); Palanisamy Subramanian, Chennai (IN)

(73) Assignee: Dell Products L.P., Round Rock, TX (US)

( * ) Notice: Subject to any disclaimer, the term of this patent is extended or adjusted under 35 U.S.C. 154(b) by 267 days.

(21) Appl. No.: 16/390,805

(22) Filed: Apr. 22, 2019

(65) Prior Publication Data

US 2020/0336368 A1    Oct. 22, 2020

(51) Int. Cl.
| | |
|---|---|
| *H04L 12/24* | (2006.01) |
| *H04L 12/709* | (2013.01) |
| *H04L 12/751* | (2013.01) |
| *H04L 12/753* | (2013.01) |
| *H04L 12/46* | (2006.01) |

(52) U.S. Cl.
CPC .......... *H04L 41/082* (2013.01); *H04L 12/462* (2013.01); *H04L 45/02* (2013.01); *H04L 45/245* (2013.01); *H04L 45/48* (2013.01)

(58) Field of Classification Search
CPC ..... H04L 12/462; H04L 1/00; H04L 12/4625; H04L 41/082; H04L 45/02; H04L 45/245; H04L 45/48; H04L 12/24; H04L 12/46
See application file for complete search history.

(56) References Cited

U.S. PATENT DOCUMENTS

| | | | | |
|---|---|---|---|---|
| 7,209,435 | B1* | 4/2007 | Kuo | H04L 45/00 370/219 |
| 2008/0101219 | A1* | 5/2008 | Rose | H04L 45/48 370/224 |
| 2010/0002577 | A1* | 1/2010 | Moreno | H04L 41/12 370/221 |
| 2011/0317548 | A1* | 12/2011 | Pustylnik | H04L 43/0811 370/217 |
| 2019/0227812 | A1* | 7/2019 | Akkineni | G06F 9/4416 |

* cited by examiner

*Primary Examiner* — Mewale A Ambaye
(74) *Attorney, Agent, or Firm* — Norton Rose Fulbright US LLP

(57) ABSTRACT

A first information handling system may detect a reboot condition for the first information handling system. The first information handling system may transmit a first notification to a second information handling system, notifying the second information handling system that the first information handling system is going to reboot. The first information handling system may transmit a second notification to a third information handling system, instructing the third information handling system to age out old root information. The first information handling system may then reboot.

20 Claims, 5 Drawing Sheets

NOTIFICATION AND TRANSFER OF LINK AGGREGATION GROUP CONTROL IN ANTICIPATION OF A PRIMARY NODE REBOOT

FIELD OF THE DISCLOSURE

The instant disclosure relates to communication between information handling systems. More specifically, portions of this disclosure relate to notifying connected information handling systems of a pending primary node reboot.

BACKGROUND

As the value and use of information increase, individuals and businesses seek additional ways to process and store information. One option available for such a purpose is the information handling system (IHS). An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be connected to facilitate information sharing. For example, client information handling systems, such as personal computers, laptops, tablets, servers, routers, switches, such as top of rack (TOR) switches, and other information handling systems may be connected to each other via intermediary information handling systems, such as routers and switches, to facilitate transmission and receipt of information. As the number of interconnected information handling systems increases, the complexity of networks of intermediary information handling systems, to facilitate information sharing, also increases.

Information handling systems may, from time to time, encounter conditions requiring a system reboot. For example, an information handling system may encounter one or more errors, which may be resolved by a system reboot. Alternatively or additionally, software, hardware, and/or firmware may be updated, and such updates may require a system reboot to apply the updates to the system. Rebooting an information handling system may cause a lapse in service. For example, if an intermediary information handling system reboots, communication between a client information handling system and one or more other information handling systems may be interrupted. Even if multiple intermediary information handling systems are connected to the client information handling system to provide redundancy, communication between the client information handling system and other information handling systems may be temporarily interrupted, while connections between the client information handling system and intermediary information handling systems are reconfigured.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

A first information handling system may notify a second information handling system, networked to the first information handling system, of a pending reboot, to transfer control of one or more network elements to the second information handling system. Such a transfer may reduce or eliminate network downtime caused by an information handling system reboot. For example, an information handling system designated as a primary node may notify an information handling system designated as a secondary node of a pending reboot to allow the secondary node to assume control of connections between client information handling systems and the primary node and secondary node. Multiple peer intermediary information handling systems such as switches and/or routers may be connected to one or more client information handling systems to form a network of information handling systems and facilitate transmission of information from and receipt of information by the client information handling systems. A first intermediary information handling system may be designated as a primary node and may control connections between the peer information handling systems and the client information handling systems. A second intermediary information handling system may be designated as a secondary node. When the primary node detects a condition requiring a reboot, it may notify the secondary node of the pending reboot. In response to the notification, the secondary node may assume control of connections between the intermediary information handling systems and the client information handling systems. The primary node may also instruct the client information handling systems to discard root information designating the primary node as the STP root bridge, so that the client information handling systems will accept a transfer of control over links between the intermediary information handling systems and the client information handling systems to the secondary node. Pre-reboot notification and transfer of control can minimize interruptions in service that may be caused by an unanticipated reboot of the primary node and a subsequent negotiation process to transfer control of links to one of the secondary nodes. Furthermore, notifications transmitted by the primary node may remove old control information designating the rebooting information handling system as the primary node from circulation, particularly in networks with loop topologies.

A first information handling system may notify a second information handling systems of a pending reboot of the first information handling system to allow the second information handling system to assume control of connections between the first and second information handling systems and client information handling systems. The first information handling system may be a router or switch acting as an intermediary information handling system to convey information between client information handling systems, such as servers, personal computers, routers, switches, and other information handling systems. The first information handling system may be designated as a primary node, controlling connections between client information handling systems, the first information handling system, and one or more peer intermediary information handling systems. The designation of the first information handling system as the primary node may also include a designation of the first information handling system as the spanning tree protocol (STP) root bridge. For example, the first information handling system may be connected to client information handling systems and one or more peer intermediary information handling systems in a spanning tree protocol (STP) configuration. The first information handling system and the peer information handling systems may also be configured to operate in a virtual link trunking (VLT) configuration. The first information handling system may detect a reboot condition of the first information handling system. For example, the first information handling system may detect a condition, such as a hardware, software, or firmware update or an error in the first information handling system, requiring a reboot.

When a reboot condition is detected, the first information handling system may transmit a first notification to a second information handling system, which may be designated as a secondary node, that the first information handling system is preparing to reboot. The second information handling system may, for example, be a switch or router operating as a peer of the first information handling system and working with the first information handling system to facilitate transfer of information to and from client information handling systems. The second information handling system may be connected to the first information handling system via a connection, such as a virtual link trunking interconnect (VLTi) and may be configured to operate according to a virtual link trunking (VLT) protocol and/or a STP with the first information handling system. The first notification may be a VLT notification. Additionally, the first information handling system may transmit a spanning tree protocol (STP) notification to the second information handling system such as a bridge protocol data unit (BPDU). The STP notification and/or the first notification may be transmitted from a spanning tree module of the first information handling system to a spanning tree module of the second information handling system. The first notification may inform the second information handling system of a pending reboot of the first information handling system and instruct the second information handling system to assume control of VLT connections between the first and second information handling systems and client information handling systems, while the STP notification may instruct the second information handling system to age out root information in the second information handling system designating the first information handling system as the STP root bridge.

The first information handling system may also transmit a STP notification to a third information handling system that the first information handling system is preparing to reboot. The third information handling system may, for example, be a client information handling system. The third information handling system may be connected to both the first and second information handling systems which may facilitate transmission of information to and from the third information handling system. The third information handling system may also be configured to operate with the first and second information handling systems according to STP. The connections between the third information handling system and the first and second information handling systems may be bundled in a link aggregation group (LAG), such as a VLT LAG. The STP notification transmitted to the third information handling system may include a BPDU. For example, the BPDU may be transmitted from the spanning tree module of the first information handling system to a spanning tree module of the third information handling system. The STP notification may instruct the third information handling system to age out root information in the third information handling system designating the first information handling system as the STP root bridge.

In some embodiments, a first port of the first information handling system may be connected to a first port of the second information handling system. A second port of the first information handling system may be connected to a first port of the third information handling system, and a third port of the first information handling system may be connected to a second port of the third information handling system. Likewise, first and second ports of the third information handling system may be connected to second and third ports of the second information handling system. For example, the first, second, and third information handling systems may be connected in a VLT configuration having root and alternate VLT LAGs. The first information handling system may transmit STP notifications, such as BPDUs, to both the first and second ports of the third information handling system, to instruct both ports to age out root information designating the first information handling system as the primary node.

Between detection of the reboot condition and rebooting, the first information handling system may discard BPDUs received. After it has notified the second information handling system of the pending reboot, and instructed the second and third information handling systems to discard old root information, the first information handling system may reboot. After rebooting, the first information handling system may notify the second and third information handling systems that it has finished rebooting and may resume control of LAGs connecting the information handling systems.

Upon notification that the first information handling system is preparing to reboot, the second information handling system may assume control of connections, such as LAGs connecting the third information handling system to the first and second information handling systems. The second information handling system may receive a first notification from the first information handling system, notifying the second information handling system that the first information handling system is going to reboot. The first notification may, for example, be a first VLT notification. The second information handling system may also receive a first STP notification, which may include a first BPDU, instructing the second information handling system to age out root information designating the first information handling system as the STP root bridge.

In response to the receipt of the first notification, the second information handling system may change its designation to designation as a primary node. For example, the second information handling system may assume control of connections, such as one or more LAGs, between the client information handling system and the first and second information handling system. In response to receipt of the first STP notification, the second information handling system may age out old root information. For example, the second information handling system may require designation as the STP root bridge, in addition to designation as the VLT primary node, in order to assume control of the LAGs. Thus, the second information handling system may age out old root information and designate itself as the STP root bridge in response to the first STP notification. The second information handling system may configure a first port of the second information handling system connected to a second port of the third information handling system in a forwarding state. The second information handling system may also ignore any notifications, such as BPDUs, received from the third information handling system after receiving the first notification from the first information handling system. For example, after receiving a STP notification from the first information handling system instructing it to age out old root information, the third information handling system may attempt to designate itself as a STP root bridge, configuring its ports from root forwarding to designated forwarding. However, the second information handling system may ignore communications from the third information handling system attempting to assume control of the LAGs, thereby avoiding a dispute state. A dispute between the second and third information handling systems over designation of the STP root bridge, while the first information handling system is rebooting, may result in a slowdown in transfer of information to and from client information handlings systems or even network downtime. The second information handling system may avoid a dispute by ignoring communications, such as BPDUs received from the third information handling system. In cases where the second information handling system is connected to the third information handling system via multiple ports, the second information handling system may ignore BPDUs received from the third information handling system on all ports.

The second information handling system may transmit a second STP notification, to the third information handling system, notifying the third information handling system that the second information handling system is now designated as the STP root bridge. For example, the second notification may be a second BPDU. A spanning tree protocol module of the second information handling system may transmit the second notification. The second notification may also inform the third information handling system that the first port of the second information handling system has been assigned a designated role and a blocking state. For example, the second information handling system may notify the third information handling system that the first port of the second information handling system is assigned a designated role and blocking state, while the port is actually configured in a forwarding state. The third information handling system may receive the notification and may acknowledge the second information handling system as the STP root bridge. Traffic from and for the third information handling system may then be routed through the second information handling system. Thus, a dispute state may be avoided, and downtime of the network due to a reboot of the first information handling system may be minimized. Minimizing network downtime may enhance a user experience. A user may experience less latency in transmission and/or receipt of information when network downtime is minimized during a reboot of an intermediary information handling system. Reduced latency and downtime may allow a user may obtain requested information more quickly.

An information handling system may include a processor for performing the steps described herein. A computer program product may include a non-transitory computer readable medium comprising instructions to perform the steps described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
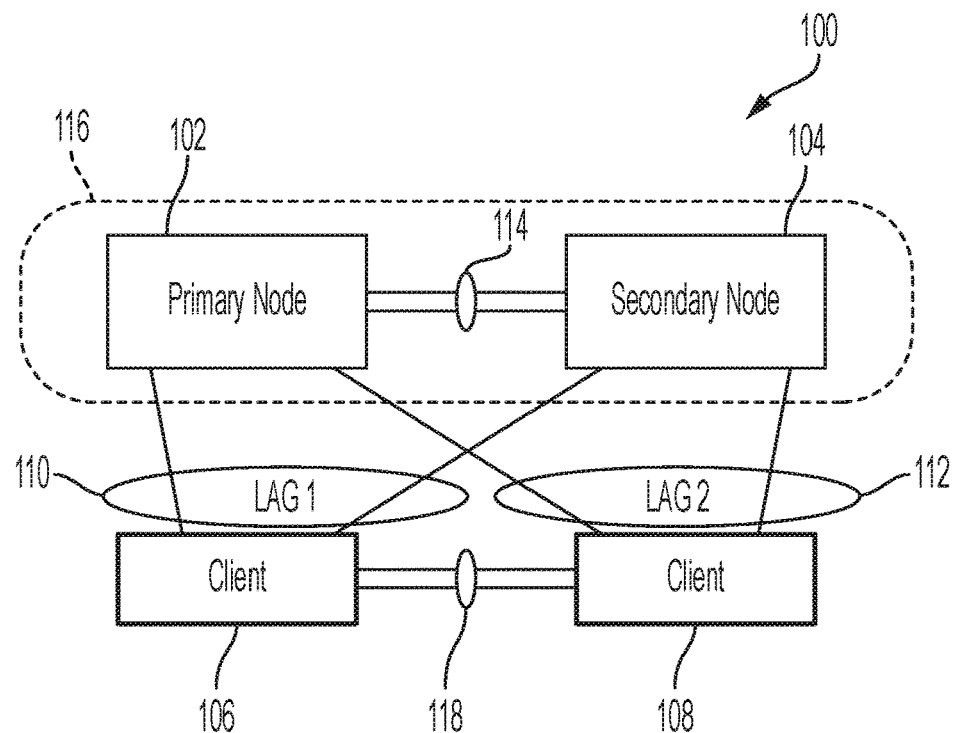
FIG. 1 is a block diagram of an example network topology with primary and secondary information handling systems and client information handling systems according to some embodiments of the disclosure.

Information handling systems may be networked to exchange information. For example, in example network 100 of FIG. 1, client information handling systems 106, 108 may communicate with an external network through intermediary information handling systems, such as primary node 102 and secondary node 104. Primary node 102 and secondary node 104 may be switches or routers. Primary node 102 and secondary node 104 may receive information from client information handling systems 106, 108 and may forward such information across a network to remote information handling systems. Likewise, primary information handling system 102 and secondary information handling system 104 may receive information transmitted from remote information handling systems via a network and may forward received information to client information handling systems 106, 108.

Primary node 102 and secondary node 104 may be located at the same level of the network topology and may thus be peer information handling systems. Primary node 102 and secondary node 104 may be configured to operate according to a virtual link trunking (VLT) protocol and/or a spanning tree protocol (STP). Client information handling systems 106, 108 may be configured to operate according to a spanning tree protocol (STP). Primary node 102 and secondary node 104 may be connected via connection 114, such as a VLTi to exchange state information, such as VLT control packets. For example, a VLT interconnect may connect the primary node and secondary node via connection 114. The primary node 102 and secondary node 104 may share information over the connection 114, such as protocol state information, MAC addresses, ARP tables, and other VLT information. Primary node 102 and secondary node 104 may be peer nodes in a first VLT domain 116. Primary node 102 may be connected to a first client information handling system 106 via a first link aggregation group 110 and to a second client information handling system 108 via a second link aggregation group 112. Likewise, the secondary node 104 may be connected to the first client information handling system 106 via a first link aggregation group 110 and to the second client information handling system 108 via the second link aggregation group 112. A VLT configuration of the primary node 102 and secondary node 104 may allow deterministic failover between the primary and secondary nodes 102, 104, so that if the primary node 102 fails, the secondary node 104 may assume control over the first LAG 110 and the second LAG 112. The primary node 102 and the secondary node 104 may act as a single logical entity to client information handling systems 106, 108, so that information from or for any of the client information handling systems 106, 108 may be forwarded through either of the primary node 102 and the secondary node 104.

In some embodiments, clients 106 and 108 may themselves be peer intermediary information handling systems, such as routers or switches, acting as a primary node and secondary node and connecting primary node 102 and secondary node 104 to additional client information handling systems connected to clients 106 and 108. Thus, clients 106 and 108 may be connected via connection 118, such as a VLTi, to exchange state information, forming a loop topology with primary node 102 and secondary node 104.

Figure 2:
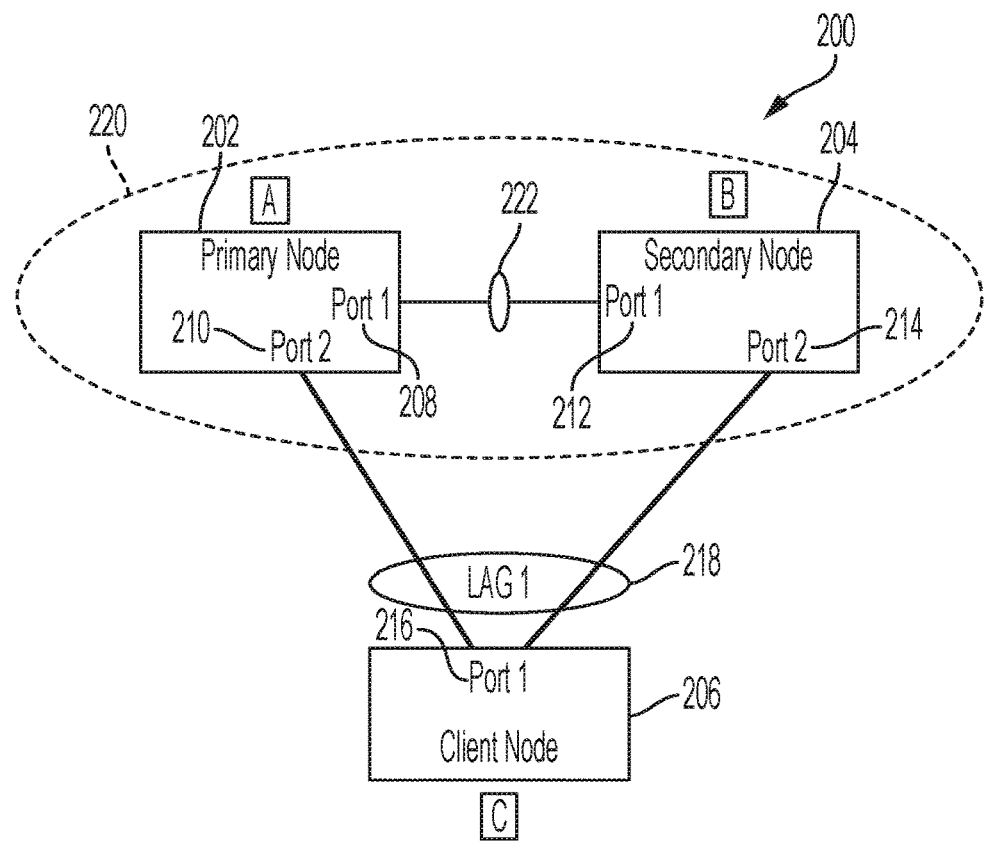
FIG. 2 is a block diagram of an example network with a single link aggregation group (LAG) connecting client and intermediary information handling systems according to some embodiments of the disclosure.

An example network of information handling systems 200, shown in FIG. 2 may include a first information handling system 202, a second information handling system 204, and a third information handling system 206. The first information handling system 202 and second information handling system 204 may be peer intermediary information handling systems, such as routers or switches, and may be configured to operate in a first domain 220, such as first VLT domain. The first and second information handling systems 202, 204 may be connected to the third information handling system 206 via a first LAG 218. The first information handling system 202 may be designated as a primary node controlling the link aggregation group 218. To facilitate its control over the link aggregation group 218, the first information handling system 202 may also be designated as a STP root bridge. The second information handling system 204 may be designated as a secondary node and may be configured to assume control of the LAG 218 if the first information handling system 202 fails. The second information handling system 204 may be the second best root. The first and second information handling systems 202, 204 may be connected to exchange control information and other information via a first connection 222, such as a VLTi. The first information handling system 202 and second information handling system 204 may be configured to operate according to a virtual link trunking (VLT) protocol, with the first and second information handling systems 202, 204 acting as a single logical entity, for purposes of receiving information from and for third information handling system 206, which may be a client node. For example, the first information handling system 202 may be connected to the second information handling system 204 via a VLT interconnect over connection 222 between a first port 208 of the first information handling system 202 and a first port 212 of the second information handling system 204. Alternatively or additional the first information handling system 202, the second information handling system 204, and the third information handling system 206 may be configured to operate according to a spanning tree protocol. The first information handling system 202 and second information handling system 204 may share information over the connection 222, such as protocol state information, MAC addresses, ARP tables, and other VLT information. LAG 218 may connect a first port 216 of the third information handling system 206 to a second port 210 of the first information handling system 202 and a second port 214 of the second information handling system 204.

If an information handling system designated as a primary node, such as first information handling system 202, reboots without notifying other networked information handling systems, such as a second information handling system 204 designated as a secondary node and a client information handling system 206, of the pending reboot, network downtime may result while the second information handling system 204 and the third information handling system 206 negotiate control over LAGs, such as LAG 218, connecting the information handling systems. For example, in some cases more than ten seconds of traffic loss may occur while the information handling systems negotiate control. When the first information handling system 202 goes to reboot, the connection 222 connecting the first port 208 of the first information handling system 202 to the first port 212 of the second information handling system 204 may go down. When the connection 222 goes down, the first port 208 of the first information handling system 202 may be configured in a designated state and the first port 212 of the second information handling system 204 may be configured in a root forwarding state to forward information from the third information handling system 206 to the first information handling system 202. A first connection of the LAG 218 connecting the first port 216 of the third information handling system 206 to the second port 210 of the first information handling system 202 may also go down. When the connection between the third information handling system 206 and the first information handling system 202 goes down, the first port 216 of the third information handling system 206 may be configured in a root forwarding state, and the second port 210 of the first information handling system 202 may be configured in a designated forwarding state.

When the connection 222 between the first information handling system 202 and the second information handling system 204 goes down, the state of the first port 212 of the second information handling system 204 may be changed to a disabled discarding state. The second information handling system 204 may then designate itself as the primary node. Furthermore, the second information handling system 204 may designate itself as the spanning tree protocol (STP) root bridge. The second information handling system 204 may transmit notifications, such as BPDUs, via the second port 214 of the second information handling system 204 and LAG 218 claiming that the second information handling system 204 is the STP root bridge. BPDUs may, for example, be STP BPDUs. The third information handling system 206 may receive such notifications at port 216 and may ignore the notifications because the third information handling system 206 may still possess root information designating the first information handling system 202 as the STP root bridge. After a predetermined period of time without communication from the first information handling system 202, the third information handling system 206 may age out the root information designating the first information handling system 202 as the STP root bridge. For example, the third information handling system 206 may wait until a time period equal to three times a hello time interval has passed before aging out the root information. At such a time, the third information handling system 206 may attempt to designate itself as the STP root bridge, changing the status of the port 216 to designated forwarding and transmitting a BPDU to the second information handling system 204 via LAG 218 claiming itself as the STP root bridge. When the second information handling system 204 receives the BPDU from the third information handling system 206, it may enter a dispute state, and may change a status of the second port 214 to designated blocking. In the dispute state, the second information handling system 204 and the third information handling system 206 may negotiate to establish the second information handling system 204 as the STP root bridge, with control over LAG 218. During this process, after the first information handling system has gone to reboot, the network may experience a slowdown or even downtime, with the second information handling system 204 unable to accept information from or forward information to the third information handling system 206 until the second information handling system 204 has been designated as the STP root bridge and the dispute state has been resolved.

In order to minimize downtime, the first information handling system 202 may notify the second information handling system 204 of a pending reboot, to allow the second information handling system 204 to assume control of the LAG 218. For example, the first information handling system 202 may detect a reboot condition, such as a pending firmware update requiring a reboot of the first information handling system 202 or other reboot condition. Detecting a reboot condition may include determining that a reboot is scheduled to occur within a specified time frame. For example, the first information handling system may determine that a reboot to apply a software update is scheduled to occur in sixty seconds, or another time frame. The time frame may, for example, be set to allow the second information handling system time to assume control of one or more LAGs. The first information handling system 202 may transmit a first VLT notification over connection 222 between the first port 208 of the first information handling system 202 and the first port 212 of the second information handling system 204 notifying the second information handling system 204 of the pending reboot and instructing the second information handling system 204 to designate itself as the primary node and assume control of the LAG 218. The first VLT notification may be transmitted by a first spanning tree module of the first information handling system 202. The first information handling system 202 may also transmit a first STP notification, such as a first BPDU, to the second information handling system 204. For example, a spanning tree module of the first information handling system 202 may transmit the first BPDU via connection 222 to a spanning tree module of the second information handling system 204. When the first BPDU is transmitted, the first port 208 of the first information handling system 202 may be configured in a designated state, while the first port 212 of the second information handling system 204 may be configured in a root forwarding state. The first BPDU may instruct the second information handling system 204 to age out root information designating the first information handling system as the STP root bridge. For example, the first BPDU may have a message age set equal to a maximum message age, to cause the second information handling system 204 to age out root information. The second information handling system 204 may receive the first BPDU at port 212 and may age out root information. Thus, the second information handling system may receive the first VLT notification and the first STP notification and may designate itself as the VLT primary node and the STP root bridge in response. In some embodiments, the second information handling system 204 may change its designation to designation as the primary node, while in other embodiments the second information handling system 204 may assume control of LAG without formally changing its status designation as the primary node. The second information handling system 204 may then transmit one or more BPDUs over LAG 218 between the second port 214 of the second information handling system 204 and the first port 216 of the third information handling system 206. For example, the second information handling system 204 may transmit one or more BPDUs informing the third information handling system 206 that the second information handling system 204 is STP root bridge and that the second port 214 of the second information handling system 204 is configured in a designated blocking state. While the second information handling system 204 is transmitting BPDUs, the second port 214 of the second information handling system 204 may be configured in a designated forwarding state even though the second information handling system 204 is informing the third information handling system 206 that the second port 214 is configured in a designated blocking state.

The first information handling system 202 may also instruct the third information handling system 206 to age out old root information in response to a pending reboot. The third information handling system 206, being unaware of the VLT node status of the first information handling system 202 and the second information handling system 204 may be instructed to age out root information designating the first information handling system 202 as the STP root bridge, without informing the third information handling system 206 of a pending reboot. The first information handling system 202 may transmit a second BPDU over via LAG 218 between the second port 210 of the first information handling system 202 and the first port 216 of the third information handling system 206. For example, a spanning tree module of the first information handling system 202 may transmit the second BPDU via LAG 218 to a spanning tree module of the third information handling system 206. When the second BPDU is transmitted, the second port 210 of the first information handling system 202 may be configured in a designated forwarding state, while the first port 216 of the third information handling system 206 may be configured in a root forwarding state. The second BPDU may instruct the third information handling system 206 to age out root information designating the first information handling system 202 as the STP root bridge. For example, the second BPDU may have a message age set equal to a maximum message age, to cause the third information handling system 206 to age out root information. The third information handling system 206 may receive the second BPDU at port 216. The third information handling system 206 may then begin to advertise itself as the STP root bridge, transmitting BPDUs claiming root status to the first information handling system 202 and/or the second information handling system 204 via LAG 218. For example, the first port 216 of the third information handling system 206 may be reconfigured to operate in a designated forwarding state and may transmit a BPDU to the second information handling system 204 via LAG 218 claiming itself as the STP root bridge with port 216 being configured to operate in a designated forwarding state. The second port 214 of the second information handling system 204 may ignore, or drop, BPDUs received from the third information handling system 206, claiming the third information handling system 206 as the STP root bridge. Thus, a dispute state between the second information handling system 204 and the third information handling system 206 may be avoided. The third information handling system 206, when it receives a BPDU from the second information handling system 204 claiming the second information handling system 204 as the STP root bridge, may accept the designation of the second information handling system 204 as the STP root bridge. The first port 216 of the third information handling system 206 may then change its status to root forwarding. The first information handling system 202 may then reboot, with the second information handling system 204 having assumed control of LAG 218, and network slowdown or downtime resulting from selection of a new primary node upon reboot of a primary node may be reduced.

Figure 3:
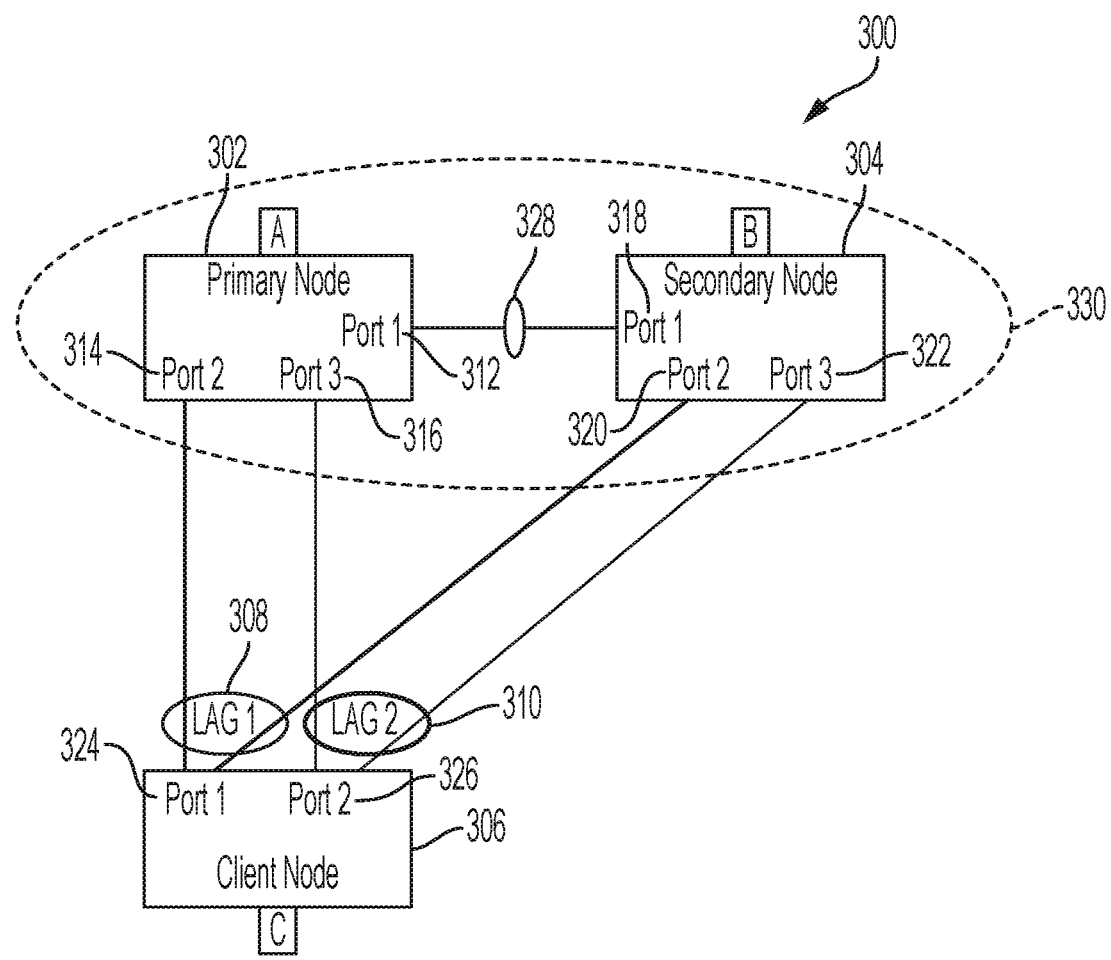
FIG. 3 is a block diagram of an example network with multiple LAGs connecting client and intermediary information handling systems according to some embodiments of the disclosure.

In some network topologies, multiple LAGs may connect information handling systems. For example, in the network 300 of FIG. 3 a first LAG 308 and a second LAG 310 may connect a first information handling system 302 and a second information handling system 304 to a third information handling system 306. The first information handling system 302 and second information handling system 304 may be peer intermediary information handling systems, such as routers or switches, and may be configured to operate in a first domain 330, such as first VLT domain. The first information handling system 302 may be designated as a VLT primary node and as a STP root bridge controlling the LAGs 308, 310. The second information handling system 304 may be designated as a secondary node and may be configured to assume control of the LAGs 308, 310 if the first information handling system 302 fails. The second information handling system 304 may be the second best root. The first and second information handling systems 302, 304 may be connected to exchange control information and other information via a first connection 328, such as a VLTi. The first information handling system 302 and second information handling system 304 may be configured to operate according to a virtual link trunking (VLT) protocol, with the first and second information handling systems 302, 304 acting as a single logical entity, for purposes of receiving information from and for third information handling system 306, which may be a client node. For example, the first information handling system 302 may be connected to the second information handling system 304 via a VLT interconnect over connection 328 between a first port 312 of the first information handling system 302 and a first port 318 of the second information handling system 304. The first information handling system 302, the second information handling system 304, and the third information handling system 306 may be configured to operate according to a spanning tree protocol. The first information handling system 302 and second information handling system 304 may share information over the connection 328, such as protocol state information, MAC addresses, ARP tables, and other VLT information. A first LAG 308 may connect a first port 324 of the third information handling system 306 to a second port 314 of the first information handling system 302 and a second port 320 of the second information handling system 304. A second LAG 310 may connect a second port 326 of the third information handling system 306 to a third port 316 of the first information handling system 302 and a third port 322 of the second information handling system 304.

Rebooting of a primary node without notifying peer information handling systems may result in network slowdowns and/or downtime. For example, if an information handling system designated as a primary node, such as first information handling system 302, reboots without notifying peer information handling systems, such as a second information handling system 304 designated as a secondary node, of the pending reboot, network downtime may result while the second information handling system 304 and the third information handling system 306 negotiate control of LAGs 308, 310. When the first information handling system 302 goes to reboot, the connection 328 connecting the first port 312 of the first information handling system 302 to the first port 318 of the second information handling system 304 may go down. When the connection 328 goes down, the first port 312 of the first information handling system 302 may be configured in a designated state and the first port 318 of the second information handling system 304 may be configured in a root state. A first connection of the LAG 308 connecting the first port 324 of the third information handling system 306 to the second port 314 of the first information handling system 302 may go down. A first connection of the LAG 310 connecting the second port 326 of the third information handling system 306 to the third port 316 of the first information handling system 302 may also go down. When the connections between the third information handling system 306 and the first information handling system 302 go down, the first port 324 of the third information handling system 306 may be configured in a root state, the second port 314 of the first information handling system 302 may be configured in a designated state, the third port 316 of the first information handling system 302 may be configured in a designated state, and the second port 326 of the third information handling system 306 may be configured in an alternate state.

When the connection 328 between the first information handling system 302 and the second information handling system 304 goes down, the first port 318 of the second information handling system 304 may change its state to a disabled discarding state. The second information handling system 304 may designate itself as the VLT primary node and as the STP root bridge. The second information handling system 304 may transmit STP notifications, such as BPDUs, via the second port 320 and the third port 322 of the second information handling system 304 claiming that the second information handling system 304 is the STP root bridge. The third information handling system 306 may receive such notifications at ports 324, 326 and may ignore the notifications because the third information handling system 306 may still possess root information designating the first information handling system 302 as the spanning root bridge. After a predetermined period of time without communication from the first information handling system 302, the third information handling system 306 may age out the root information designating the first information handling system 302 as the spanning root bridge. For example, the third information handling system 306 may wait until a time period equal to three times a hello time interval has passed before aging out the root information. However, the root information may be aged out on only a single port, such as the first port 324 of the third information handling system, while the second port 326 of the third information handling system 306 retains the old root information. At such a time, the third information handling system 306 may change the status of the first port 324 of the third information handling system 306 to a designated state and the second port 326 of the third information handling system 306 to a root state because the second port 326 is still in possession of old root information. The third information handling system 306 may then transmit BPDUs on the first and second LAGs 308, 310 to the second information handling system 304 recirculating the old root information. When the second information handling system 304 receives the BPDUs from the third information handling system 306, it may accept the old root information and may change the status of the second port 320 of the second information handling system 304 to root and the third port 322 of the second information handling system 304 to alternate. Thus, in such implementations, stale root information may be circulated leading to network slowdowns and even downtime. For example, in loop topologies circulation of stale root information may lead to delays up to or exceeding two to three seconds in assumption of control over one or more LAGs by the second information handling system 304.

In order to minimize slowdown and downtime due to stale root information, the first information handling system 302 may notify the second information handling system 304 of a pending reboot, to allow the second information handling system 304 to assume control of the LAGs 308, 310. For example, the first information handling system 302 may detect a reboot condition, such as a pending firmware update requiring a reboot of the first information handlings system 302 or other reboot condition. The first information handling system 302 may transmit a first VLT notification to the second information handling system 304 notifying the second information handling system of the pending reboot and instructing the second information handling system to designate itself as the VLT primary node and assume control over LAGs 308, 310. The second information handling system may receive the VLT notification and may designate itself as the VLT primary node, assuming control over LAGs 308, 310. The first information handling system may also transmit a first STP notification, such as a first BPDU, over connection 328 between the first port 312 of the first information handling system 302 and the first port 318 of the second information handling system 304. For example, a spanning tree module of the first information handling system 302 may transmit the first BPDU via connection 328 to a spanning tree module of the second information handling system 304. When the first BPDU is transmitted, the first port 312 of the first information handling system 302 may be configured in a designated state, while the first port 318 of the second information handling system 304 may be configured in a root state. The first BPDU may instruct the second information handling system 304 to age out root information designating the first information handling system 302 as the STP root bridge. For example, the first BPDU may have a message age equal to a maximum message age, which may cause the first port 318 of the second information handling system 304 to age out the root information. The second information handling system 304 may receive the first BPDU at port 318 and may age out old root information, designating itself as the STP root bridge. Thus, the second information handling system 304 may receive the first VLT notification and the first STP notification and may designate itself as the VLT primary node and the STP root bridge, assuming control of LAGs 308, 310. In some embodiments, the second information handling system 304 may change its designation to primary node while in other embodiments the second information handling system 304 may assume control of LAGs 308, 310 without formally changing its designation to primary. After receipt of the first BPDU, the second information handling system 306 may configure the first port 318 of the second information handling system 306 to operate in a designated state. The second information handling system 304 may then transmit one or more BPDUs over the first LAG 308 between the second port 320 of the second information handling system 304 and the first port 324 of the third information handling system 306 and the second LAG 310 between the third port 322 of the second information handling system 304 and the second port 326 of the third information handling system 306. For example, the second information handling system 304 may transmit one or more BPDUs informing the third information handling system 306 that the second information handling system 304 is the STP root bridge and that the second port 320 of the second information handling system 304 is configured in a designated blocking state. While the second information handling system 304 is transmitting BPDUs after assuming control of the LAGs 308, 310, the second port 320 of the second information handling system 304 may be configured in a designated forwarding state even though the second information handling system 304 is informing the third information handling system 306 that the second port 320 is in a designated blocking state.

The first information handling system 302 may also instruct the third information handling system 306 to discard old root information, prior to rebooting. The first information handling system 302 may transmit a second BPDU over via LAG 308 between the second port 314 of the first information handling system 302 and the first port 324 of the third information handling system 306. For example, a spanning tree module of the first information handling system 302 may transmit the second BPDU via LAG 308 to a spanning tree module of the third information handling system 306. When the second BPDU is transmitted, the second port 314 of the first information handling system 302 may be configured in a designated state, such as a designated forwarding state, the first port 324 of the third information handling system 306 may be configured in a root state, such as a root forwarding state, the third port 316 of the first information handling system 302 may be configured in a designated state, and the second port 326 of the third information handling system 306 may be configured in an alternate state. The second BPDU may instruct the third information handling system 306 to age out root information designating the first information handling system 302 as the STP root bridge on the first port 324. For example, the second BPDU may have a message age set equal to a maximum message age, to cause the third information handling system 306 to age out root information. However, the second BPDU may be received only at the first port 324, and may therefore only age out the old root information on the first port 324. The third information handling system 306 may receive the second BPDU at the first port 324. The third information handling system 306 may then age out the root information on the first port 324 of the third information handling system 306, and the first port 324 may be configured to operate in a designated blocking state. The second port 326, still holding old root information designating the first information handling system 302 as the STP root bridge, may be configured in a root forwarding state. The first and second ports 324, 326 of the third information handling system 306 may then begin to circulate old root information still present at the second port 326 of the third information handling system 306. The old root information may, for example, be transmitted to any of the first and second information handling systems 302, 304 via LAGs 308, 310, in the form of BPDUs. Upon detecting the reboot condition, the first information handling system 302 may discard all BPDUs received from any connected information handling systems, including the third information handling system 306. The first information handling system 302 may thus discard old root information received from the third information handling system 306, preventing circulation of old root information. Likewise, after it receives the first BPDU, the second information handling system 304 may discard BPDUs received from the third information handling system 306. For example, the second information handling system 304 may discard all BPDUs claiming the first information handling system 302 as the STP root bridge received from the third information handling system 306. Discarding BPDUs claiming the first information handling system 302 as the STP root bridge may reduce circulation of old root information.

However, the third information handling system 306 may refuse to accept BPDUs from the second information handling system 304 because the second port 326 of the third information handling system 306 may still possess old root information. The first information handling system may transmit a third BPDU via LAG 310 to the second port 326 of the third information handling system 306, instructing the second port 326 to age out old root information. The second port 326 may receive the third BPDU and may age out old root information. The second port 326 may then be configured to operate in a designated blocking state. Once the old root information on both the first port 324 and the second port 326 of the third information handling system 306 is aged out, the third information handling system 306 may begin accepting BPDUs from the second information handling system 304 designating the second information handling system 304 as the STP root bridge. The third information handling system 306 may then configure the first port 324 of the third information handling system 306 to operate in a root state and the second port 326 of the third information handling system 306 to operate in an alternate state. The second information handling system 304 may then have control over both LAGs 308, 310, and the first information handling system 302 may reboot without causing network downtime. Thus, the first information handling system 302 may inform the second information handling system 304 of a pending reboot and may instruct both the second information handling system 304 and third information handling system 306 to age out old root information in order to reduce network downtime and to prevent old root information from circulating within the network 300. A similar method may be applied in systems with two client information handling systems, such as systems in which two client information handling systems are coupled together in a separate VLT domain from the primary and secondary nodes. In such systems, the primary node may instruct each client information handling system to discard old root information to allow the secondary node to control VLTs connecting the client information handling systems to the primary and secondary nodes.

Figure 4:
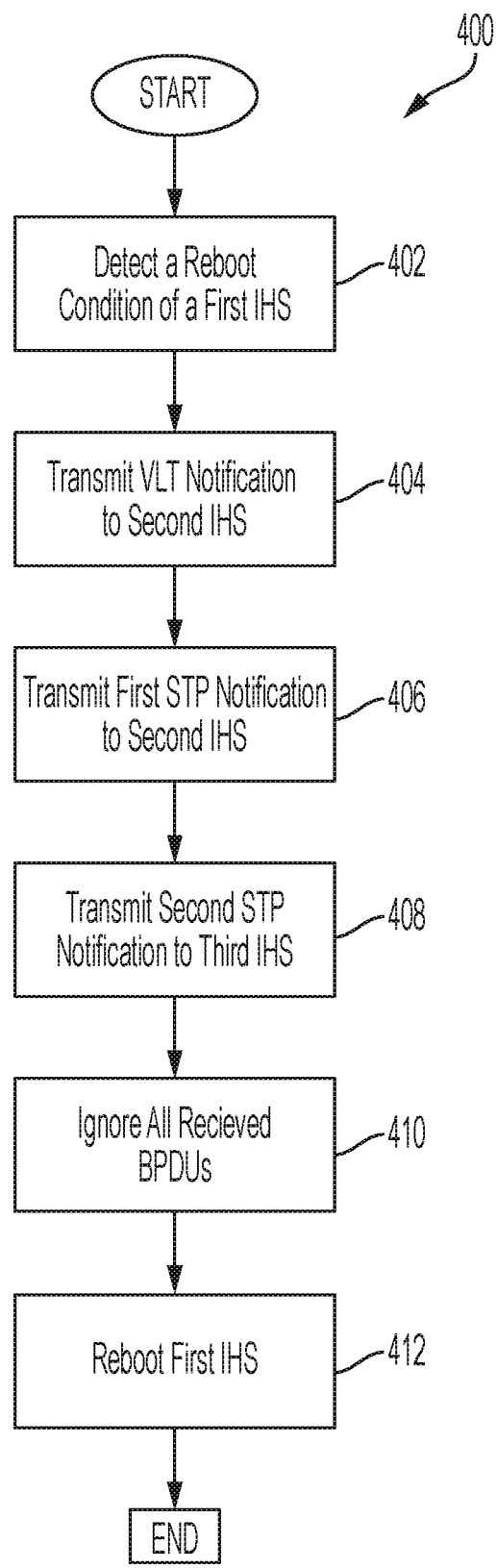
FIG. 4 is a flow chart of an example method for notifying connected information handling systems of a pending reboot of a first information handling system according to some embodiments of the disclosure.

An example method 400 for notifying networked information handling systems of a pending reboot of a primary node is shown in FIG. 4. The method 400 may be performed by a first information handling system and may begin, at step 402, with detecting a reboot condition of a first information handling system. The first information handling system may be designated as a primary node and may, with other networked information handling systems, operate according to a VLT protocol. A reboot condition may, for example, include a firmware or software update requiring a reboot, installation of new hardware, an error in the information handling system requiring a reboot for resolution, or other reboot condition. Detecting a reboot condition may include determining that a reboot is scheduled to occur within a specified time frame. For example, the first information handling system may determine that a reboot to apply a software update is scheduled to occur in sixty seconds, or another time frame. The time frame may, for example, be set to allow the second information handling system time to assume control of one or more LAGs.

At step 404, the first information handling system may transmit a first reboot notification to a second information handling system. The reboot notification may be transmitted across a connection between a first port of the first information handling system and a first port of the second information handling system, such as an VLT interconnect. The second information handling system may, for example, be a secondary node configured to replace the first information handling system if the first information handling system fails. The reboot notification may be transmitted by a spanning tree module of the first information handling system and may be received by a spanning tree module of the second information handling system. For example, the first reboot notification may be a VLT notification informing the second information handling system of the pending reboot and instructing the second information handling system to designate itself as the VLT primary node and to assume control of one or more LAGs connecting the first information handling system, the second information handling system, and a client information handling system. The second information handling system may receive the VLT notification and may designate itself as the VLT primary node in response.

At step 406, the first information handling system may transmit a first STP notification to the second information handling system. The first STP notification may, for example be a first BPDU. The first BPDU may instruct the second information handling system to age out root information designating the first information handling system STP root bridge. When the root information is aged out, the second information handling system may designate itself as the STP root bridge, in addition to the VLT primary node.

At step 408, the first information handling system may transmit a second STP notification, such as a second BPDU, to a third information handling system. The third information handling system may, for example, be a client information handling system of the first and second information handling systems, such as a top of rack (TOR) switch. The second BPDU may be transmitted across a connection between a second port of the first information handling system and a first port of the third information handling system. For example, the second reboot notification may be transmitted across a VLT LAG connection between a second port of the first information handling system and a first port of the third information handling system. The second reboot notification may be transmitted by a spanning tree module of the first information handling system and may be received by a spanning tree module of the third information handling system. The second BPDU may instruct the third information handling system to age out root information designating the first information handling system as STP root bridge. When the root information is aged out, the third information handling system may accept BPDUs received from the second information handling system designating the second information handling system as the STP root bridge. In some embodiments, multiple ports of the third information handling system may be connected to the first and second information handling system via multiple LAGs. In such embodiments, the first information handling system may transmit reboot notifications across each of the LAGs to each connected port of the third information handling system instructing each port of the third information handling system to discard root information designating the first information handling system as the STP root bridge. In some embodiments, multiple client information handling systems may be connected to the first and second information handling systems via multiple LAGs. In such embodiments, the first information handling system may transmit reboot notifications to each of the client information handling systems instructing each client information handling system to age out old root information designating the first information handling system as the STP root bridge.

At step 410, the first information handling system may ignore all received BPDUs. For example, the first information handling system may drop all BPDUs received from the third information handling system, and any other client information handling systems, after detecting the reboot condition. The first information handling system may also drop BPDUs received from the second information handling system. After aging out the old root information, the third information handling system and the second information handling system may each begin transmitting BPDUs to the first information handling system claiming themselves as the STP root bridge. The first information handling system, as it is set to reboot, may ignore received BPDUs, which may reduce circulation of old root information and avoid commencement of dispute states.

At step 412, the first information handling system may reboot. Because the second information handling system has assumed control over LAGs connecting client information handling systems to the first and second information handling systems prior to rebooting of the first information handling system, the client information handling systems may experience minimal network downtime or slowdown resulting from the reboot of the first information handling system. When the first information handling system finishes rebooting, it may resume control of LAGs connecting client information handling systems, such as the third information handling system, to the first and second information handling systems. The second information handling system may relinquish control of the LAGs and may revert its designation to designation as a secondary node.

Figure 5:
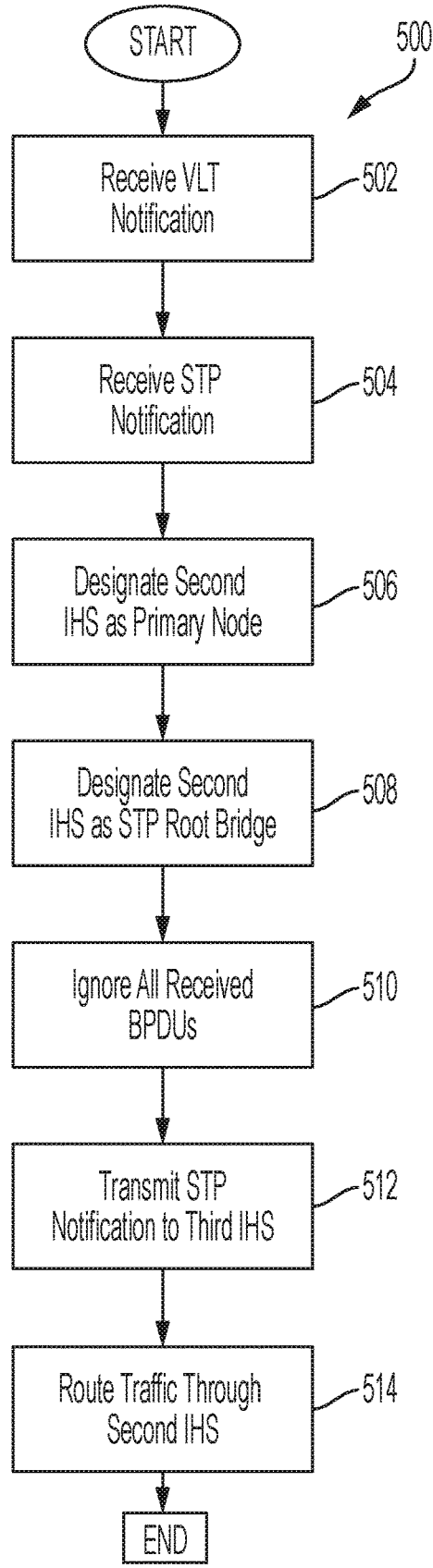
FIG. 5 is a flow chart of an example method for assuming control of one or more LAGs when notified of a pending reboot of a first information handling system according to some embodiments of the disclosure.

An example method 500 for receipt of a reboot notification and adjustment of node status based on the reboot notification is shown in FIG. 5. The method 500 may be performed in parallel with the method 400 of FIG. 4. The method 500 may be performed by a second information handling system and may begin, at step 502, with receipt of a reboot notification. The second information handling system may be designated as a secondary node and may, with other networked information handling systems, operate according to a VLT protocol. The second information handling system may receive a VLT notification from a first information handling system designated as a primary node. The reboot notification may be received by a spanning tree module of the second information handling system. The VLT notification may, for example, inform the second information handling system that the first information handling system is going to reboot and may instruct the second information handling system to designate itself as the VLT primary node and to assume control over one or more LAGs connecting the first information handling system, the second information handling system and a client information handling system.

At step 504, the second information handling system may receive a STP notification. The STP notification may, for example, be a BPDU received at a first port of the second information handling system. The reboot notification may instruct the second information handling system to age out old root information designating the first information handling system as the STP root bridge.

At step 506, the second information handling system may designate itself as the primary node. For example, the second information handling system may designate itself as the primary node and assume control of one or more LAGs connecting client information handling systems, such as the third information handling system, to the first and second information handling systems. In some embodiments, the second information handling system may assume control of LAGs connecting client information handling systems to the first and second information handling systems without formally changing its designation.

At step 508, the second information handling may designate itself as the STP root bridge. For example, based on the received STP notification, the second information handling system may designate itself as the STP root bridge, and may configure its ports accordingly, as discussed herein.

At step 510, the second information handling system may ignore all BPDUs received from client information handling systems, such as the third information handling system. For example, after the first notification from the first information handling system is received, the second information handling system may begin dropping all BPDUs received from client information handling systems. When the third information handling system ages out old root information designating the first information handling system as the STP root bridge, it may begin to transmit BPDUs to the first and second information handling system via one or more LAGs connecting the third information handling system to first and second information handling systems designating the third information handling system as the STP root bridge. In order to avoid a dispute state between the second information handling system and the third information handling system, with both claiming STP root bridge status, the second information handling system may ignore BPDUs received from the third information handling system. Avoiding a dispute state may minimize network slowdowns and downtime. Furthermore, in systems with loop topologies the third information handling system may circulate old root information designating the first information handling system as the STP root bridge. To reduce circulation of old root information, the second information handling system may drop BPDUs received from client information handling systems, such as the third information handling system, designating the first information handling system as the STP root bridge.

At step 512, the second information handling system may transmit a notification of its designation as the STP root bridge to the third information handling system. For example, the second information handling system may transmit a notification, such as a BPDU, to the third information handling system over an LAG connecting the third information handling system to the second information handling system notifying the third information handling system that a second port of the second information handling system, connected to a first port of the third information handling system via the LAG, is configured with a designated role and a blocking state. In some embodiments, the second port of the second information handling system may actually be configured in a forwarding state contrary to the notification. When multiple ports of the third information handling system are connected to the first and second information handling systems via multiple LAGs, the second information handling system may transmit a notification on each LAG to each connected port of the third information handling system, notifying each port of the third information handling system of the designation of the second information handling system as the STP root bridge. When multiple client information handling systems are connected to the first and second information handling systems via multiple LAGs, the second information handling system may transmit notifications to each of the connected client information handling systems across each LAG to notify each information handling system of the designation of the second information handling system as the STP root bridge.

At step 514, traffic from and for the third information handling system may be routed through the second information handling system. For example, when the third information handling system makes a request for data, the request may be routed through the second information handling system on its way to a remote client and the requested data may be routed through the second information handling system on its way to the third information handling system. When the second information handling system is connected to multiple ports of a third information handling system via multiple LAGs or to multiple client information handling systems via multiple LAGs, it may ignore BPDUs from each connected port and/or client information handling system. In some embodiments, the second information handling system may also ignore subsequent BPDUs received from the first information handling system. In some embodiments, some traffic may have already been routed through the second information handling system prior to the second information handling system's control of LAGs connecting the first, second, and third information handling systems. In such embodiments, routing traffic from and for the third information handling system through the second information handling system may include routing additional traffic through the second information handling system, that would otherwise have been routed through the first information handling system.

Figure 6:
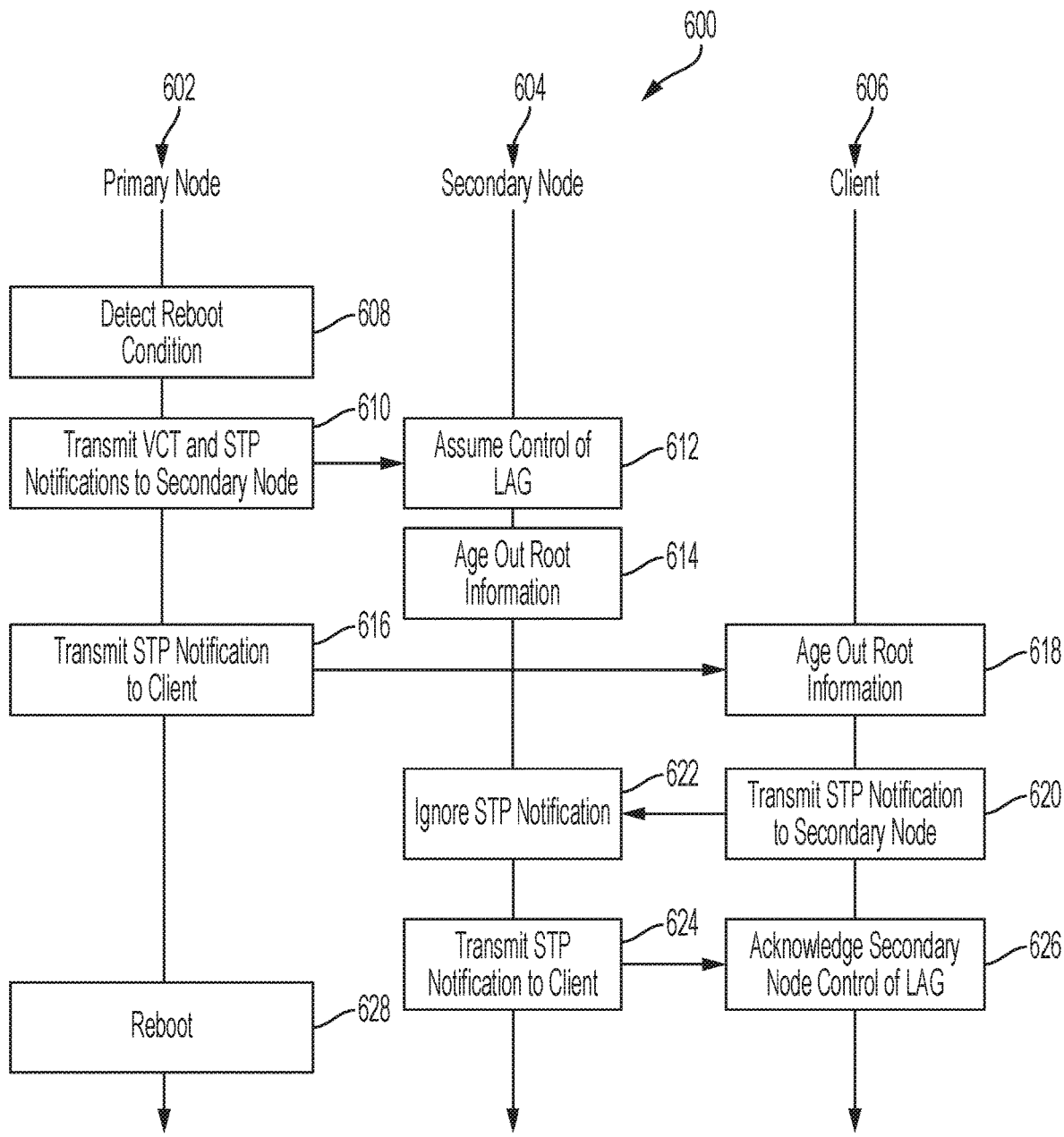
FIG. 6 is a process flow diagram of an example process for transferring control of one or more LAGs to a secondary node when a primary node detects a reboot condition according to some embodiments of the disclosure.

A first information handling system and second information handling, configured to operate according to a VLT protocol, and a third information handling system may communicate with each other to avoid a dispute between the second and third information handling systems when the first information handling system reboots. An example process flow diagram 600 of a process for transferring LAG control to a second information handling system is shown in FIG. 6. A primary node 602 and a secondary node 604 may be connected to a client information handling system 606 via one or more VLT LAGs. At step 608, the first information handling system, designated as the primary node 602, may detect a reboot condition. For example, the primary node may receive a firmware or software update requiring a reboot for application, may detect a new hardware component requiring a reboot for installation, may detect an error requiring a reboot for correction, or may detect another reboot condition.

At step 610, the primary node 602 may transmit a VLT notification and a STP notification to a second information handling system, which may be designated as the secondary node 604. The VLT and STP notifications may be transmitted separately and, in some cases, at separate times. For example, a first port of the primary node 602 may be connected to a first port of the secondary node 604 via a VLT interconnect. A spanning tree module of the primary node 602 may, for example, transmit a VLT and STP notifications via the first port of primary node 602, the VLT interconnect, and the second port of the secondary node 604, to a spanning tree module of the secondary node 604. The VLT notification may, for example, notify the secondary node 604 that the primary node 604 is going to reboot and may instruct the secondary node to designate itself as the primary node and to assume control of one or more LAGs. The STP notification may, for example, be a BPDU, and may instruct the secondary node 604 to age out old root information and to designate itself as the STP root bridge.

At step 612, the secondary node 604 may assume control of one or more LAGs connecting the primary node 602 and the secondary node 604 to one or more client information handling systems, such as client 606. In some embodiments, the secondary node 604 may change its designation from designation as a secondary node to designation as a primary node. For example, the secondary node 604 may change its designation and assume control of one or more LAGs based on a received VLT notification.

At step 614, the secondary node 604 may age out old root information. For example, the BPDU transmitted by the primary node 602 at step 610 may instruct the secondary node 604 to age out root information designating the primary node 602 as the STP root bridge. The BPDU may have a message age set to a maximum age value. A rapid spanning tree protocol of the first port of the secondary node 604 may, for example, check a message age of the BPDU and may age out root information designating the primary node 602 as the STP root bridge based on the message age.

At step 616, the primary node may also transmit a BPDU to a third information handling system, which may be a client 606. For example, a second port of the primary node 602 may be connected to a first port of the client 606 via a VLG LAG. A spanning tree module of the primary node 602 may, for example, transmit a first BPDU via the second port of primary node 602, VLT LAG, and the first port of the client 606, to a spanning tree module of the client 606.

At step 618, the client 606 may age out old root information. For example, the BPDU transmitted by the primary node 602 at step 616 may instruct the client to age out root information designating the primary node 602 as the STP root bridge. The BPDU may have a message age set to a maximum age value. A rapid spanning tree protocol of the first port of the client 606 may, for example, check a message age of the BPDU and may age out root information designating the primary node 602 as the STP root bridge based on the message age.

At step 620, the client 606 may transmit a BPDU to the secondary node 604. For example, the client 606 may attempt to designate itself as the STP root bridge and attempt to assume control of one or more LAGs connecting the primary node 602 and the secondary node 604 to the client 606. At step 622, the secondary node 604 may ignore the BPDU transmitted by the client 606. For example, after receiving the BPDU from the primary node 602, the secondary node 604 may discard all BPDUs received from client information handling systems to avoid entering a dispute state. In networks with loop topologies, the secondary node 604 may discard all BPDUs received from the client 606 designating the primary node 602 as the STP root bridge.

At step 624, the secondary node 604 may transmit a BPDU to the client 606, informing the client that the secondary node 604 is now designated as the STP root bridge. For example, the secondary node 604 may transmit a BPDU to the client 606 informing the client 606 that the secondary node 604 has been redesignated as the STP root bridge and that the second port of the secondary node 604 is configured with a designated role and a blocking state. The client 606 may receive the BPDU from the secondary node 604. Based on the BPDU, the client 606 may acknowledge control by secondary node 604 over one or more LAGs connecting the secondary node 604 and the client 606 and may update information on one or more ports of the client 606 to include root information designating the secondary node 604 as the STP root bridge. In assuming control of the LAG, at step 624, the secondary node 604 may begin routing traffic to and from the client 606 through itself. At step 628, the primary node 602 may reboot. Thus, the secondary node 604 may assume control of one or more LAGs connecting the primary node 602 and the secondary node 604 to the client 606 and a dispute state between the secondary node 604 and the client 606 over which of the two will control the one or more LAGs may be avoided.

The schematic flow chart diagrams and process flow diagram of FIGS. 4-6 are generally set forth as logical flow diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for maintaining network operation during a reboot of a first information handling system, the method comprising:
   detecting, by the first information handling system, a reboot condition of the first information handling system;
   transmitting, by the first information handling system, a first notification to a second information handling system to notify the second information handling system that the first information handling system is going to reboot;
   transmitting, by the first information handling system, a first spanning tree protocol (STP) notification comprising a first bridge protocol data unit (BPDU) to the third information handling system instructing the third information handling system to age out root information designating the first information handling system as the STP root bridge; and rebooting the first information handling system after transmitting the first notification and the first STP notification.

2. The method of claim 1, wherein the first information handling system is designated as a primary node and the second information handling system is designated as a secondary node.

3. The method of claim 2, further comprising transmitting a second STP notification comprising a second BPDU to the second information handling system instructing the second information handling system to age out root information designating the first information handling system as the STP root bridge.

4. The method of claim 3, wherein a first port of the first information handling system is connected to a first port of the third information handling system, wherein a second port of the first information handling system is connected to a second port of the third information handling system, and wherein transmitting the first STP notification comprises transmitting BPDUs from the first and second ports of the first information handling system to the first and second ports of the third information handling system to age out root information on the first and second ports of the third information handling system.

5. The method of claim 1, wherein the first notification comprises instructions to cause the second information handling system to designate itself as the primary node and to assume control of one or more link aggregation groups (LAGs) connecting the first, second, and third information handling systems.

6. The method of claim 1, further comprising discarding all BPDUs received following detection of the reboot condition and prior to rebooting.

7. A first information handling system comprising:
a processor; and
a memory,
wherein the processor is configured to perform steps comprising detecting a reboot condition of the first information handling system;
transmitting a first notification to a second information handling system to notify the second information handling system that the first information handling system is going to reboot; transmitting a first spanning tree protocol (STP) notification comprising a first bridge protocol data unit (BPDU) to the third information handling system instructing the third information handling system to age out root information designating the first information handling system as the STP root bridge; and
rebooting the first information handling system after transmitting the first STP notification and the first STP notification.

8. The information handling system of claim 7, wherein the first information handling system is designated as a primary node, and wherein the second information handling system is designated as a secondary node.

9. The information handling system of claim 8, wherein the processor is further configured to perform steps comprising transmitting a second STP notification comprising a second BPDU to the second information handling system instructing the second information handling system to age out root information designating the first information handling system as the STP root bridge.

10. The information handling system of claim 9, further comprising first and second ports, wherein the first port is connected to a first port of the third information handling system, wherein the second port is connected to a second port of the third information handling system, and wherein transmitting the first STP notification comprises transmitting BPDUs from the first and second ports to the first and second ports of the third information handling system instructing the third information handling system to age out root information on the first and second ports of the third information handling system.

11. The information handling system of claim 10, wherein the first and second ports of the first information handling system are connected to the first and second ports of the third information handling system via first and second link aggregation groups (LAGs).

12. The information handling system of claim 7, wherein the first notification comprises instructions to cause the second information handling system to designate itself as the primary node and to assume control of one or more link aggregation groups (LAGs) connecting the first, second, and third information handling systems.

13. The information handling system of claim 7, wherein the processor is further configured to perform steps comprising discarding all BPDUs received following detection of the reboot condition and prior to rebooting.

14. A method for maintaining network operation during a reboot of a first information handling system designated as a primary node, the method comprising:
receiving, by a second information handling system designated as a secondary node, a first notification from the first information handling system that the first information handling system is going to reboot;
in response to receipt of the first notification, designating the second information handling system as a primary node; and
routing traffic from a third information handling system through the second information handling system.

15. The method of claim 14, further comprising receiving a first STP notification from the first information handling system comprising a first bridge protocol data unit (BPDU) instructing the second information handling system to age out root information designating the first information handling system as the STP root bridge and designating the second information handling system as the STP root bridge based, at least in part, on the first STP notification.

16. The method of claim 15, further comprising transmitting a second spanning tree protocol (STP) notification, by the second information handling system, to a third information handling system, to notify the third information handling system that the second information handling system is designated as the STP root bridge.

17. The method of claim 16, wherein transmitting the second STP notification comprises transmitting a BPDU to the third information handling system to inform the third information handling system that the second information handling system is a STP root bridge with a port of the second information handling system connecting the second information handling system and the third information handling system having a designated role and a blocking state.

18. The method of claim 17, wherein the port is configured in a forwarding state, when it transmits the BPDU informing the third information handling system that the port has a blocking state.

19. The method of claim 14, wherein designating the second information handling system as a primary node comprises assuming control, by the second information handling system, of a link aggregation group (LAG) connecting the first information handling system, the second information handling system, and the third information handling system.

20. The method of claim 14, further comprising ignoring, by the second information handling system, BPDUs received from the third information handling system after receiving the first notification from the first information handling system.

* * * * *